(12) United States Patent
Andersson et al.

(10) Patent No.: US 10,750,525 B2
(45) Date of Patent: Aug. 18, 2020

(54) METHOD AND APPARATUSES FOR OPERATING A WIRELESS COMMUNICATION NETWORK

(71) Applicant: Telefonaktiebolaget L M Ericsson (publ), Stockholm (SE)

(72) Inventors: Håkan Andersson, Linköping (SE); Mattias Frenne, Uppsala (SE); Johan Furuskog, Stockholm (SE); Stefan Parkvall, Bromma (SE); Henrik Sahlin, Mölnlycke (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 14/771,688

(22) PCT Filed: Jun. 23, 2015

(86) PCT No.: PCT/SE2015/050729
§ 371 (c)(1),
(2) Date: Aug. 31, 2015

(87) PCT Pub. No.: WO2015/199603
PCT Pub. Date: Dec. 30, 2015

(65) Prior Publication Data
US 2016/0366697 A1 Dec. 15, 2016

Related U.S. Application Data

(60) Provisional application No. 62/016,358, filed on Jun. 24, 2014.

(51) Int. Cl.
*H04W 72/12* (2009.01)
*H04L 27/26* (2006.01)
(Continued)

(52) U.S. Cl.
CPC ...... *H04W 72/1268* (2013.01); *H04B 7/0617* (2013.01); *H04L 5/0023* (2013.01); *H04L 5/0051* (2013.01); *H04L 27/2601* (2013.01)

(58) Field of Classification Search
CPC ............. H04W 72/1268; H04B 7/0617; H04L 5/0023; H04L 5/0051; H04L 27/2601
See application file for complete search history.

(56) References Cited

U.S. PATENT DOCUMENTS

| 8,503,291 B1 * | 8/2013 | Lee | ....................... H04B 7/0456 370/208 |
| 2005/0007879 A1 * | 1/2005 | Nishida | ................. B06B 1/0223 367/99 |

(Continued)

FOREIGN PATENT DOCUMENTS

| EP | 2334122 A1 | 6/2011 |
| JP | 2010178129 A | 8/2010 |

(Continued)

OTHER PUBLICATIONS

Unknown, Author, "Remaining Issues of SRS Bandwidth configuration in UpPTS", ZTE, 3GPP TSG RAN WG1 Meeting #54bis, R1-083600, Prague, Czech Republic, Sep. 29-Oct. 3, 2008, 1-4.

(Continued)

*Primary Examiner* — Jenee Holland
(74) *Attorney, Agent, or Firm* — Murphy, Bilak & Homiller, PLLC

(57) ABSTRACT

The present disclosure pertains to a method for operating a wireless communication network, wherein a first member of the network transmits a scheduling message to a secondary member of the network and the secondary member receives the scheduling message. The secondary member schedules sounding signal transmissions and/or a corresponding schedule based on the scheduling message, wherein the scheduling message and/or the sounding signal schedule (Continued)

refers to a schedule for sounding signals based on a status of beam forming performed in the network and/or wherein the sounding signal schedule and/or the schedule message refers to a compact schedule of sounding signals.

There are also disclosed associated devices and methods.

20 Claims, 10 Drawing Sheets

(51) Int. Cl.
    *H04B 7/06*     (2006.01)
    *H04L 5/00*     (2006.01)

(56) References Cited

U.S. PATENT DOCUMENTS

| | | | |
|---|---|---|---|
| 2007/0189412 A1 | 8/2007 | Xia et al. | |
| 2007/0230373 A1* | 10/2007 | Li | H04B 7/0447 370/267 |
| 2008/0165728 A1* | 7/2008 | Liu | H04B 7/0617 370/329 |
| 2008/0267269 A1* | 10/2008 | Enescu | H04L 1/0079 375/219 |
| 2010/0056074 A1* | 3/2010 | Higuchi | H04B 7/0604 455/77 |
| 2010/0081448 A1* | 4/2010 | Wong | H04W 72/121 455/452.1 |
| 2010/0111009 A1* | 5/2010 | Pajukoski | H04B 7/0604 370/329 |
| 2010/0118730 A1* | 5/2010 | Tanaka | H04L 1/0028 370/252 |
| 2010/0195586 A1* | 8/2010 | Choi | H04W 72/042 370/329 |
| 2010/0298006 A1* | 11/2010 | Ko | H04B 7/022 455/452.2 |
| 2011/0058505 A1* | 3/2011 | Pan | H04J 11/005 370/280 |
| 2011/0098054 A1* | 4/2011 | Gorokhov | H04B 7/024 455/452.1 |
| 2011/0268028 A1* | 11/2011 | Stern-Berkowitz | H04L 5/0048 370/328 |
| 2012/0014425 A1* | 1/2012 | Zhuang | H04L 1/0015 375/224 |
| 2012/0069794 A1* | 3/2012 | Kim | H04B 7/15542 370/315 |
| 2012/0082124 A1* | 4/2012 | Kwon | H04L 5/0007 370/329 |
| 2012/0088458 A1* | 4/2012 | Nogami | H04B 7/0632 455/67.11 |
| 2012/0218967 A1* | 8/2012 | Noh | H04W 24/00 370/329 |
| 2012/0236805 A1* | 9/2012 | Kuo | H01Q 21/28 370/329 |
| 2013/0022005 A1* | 1/2013 | Yano | H04L 1/0046 370/329 |
| 2013/0034089 A1* | 2/2013 | Nakashima | H04L 5/001 370/337 |
| 2013/0053083 A1* | 2/2013 | Suh | H04L 5/0007 455/509 |
| 2013/0336176 A1* | 12/2013 | Rubin | H04B 7/26 370/280 |
| 2014/0016620 A1 | 1/2014 | Singh et al. | |
| 2014/0086167 A1* | 3/2014 | Seo | H04L 5/001 370/329 |
| 2015/0223231 A1* | 8/2015 | Noh | H04L 5/0048 370/329 |

FOREIGN PATENT DOCUMENTS

| | | |
|---|---|---|
| JP | 2010252049 A | 11/2010 |
| JP | 2010258831 A | 11/2010 |
| JP | 2012080328 A | 4/2012 |
| JP | 2013509839 A | 3/2013 |

OTHER PUBLICATIONS

Unknown, Author, "UL Sounding RS Design for E-UTRA", Alcatel-Lucent, 3GPP TSG RAN WG1 #50bis, R1-074265, Athens, China, Oct. 8-12, 2007, 1-3.

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 1-108.

\* cited by examiner

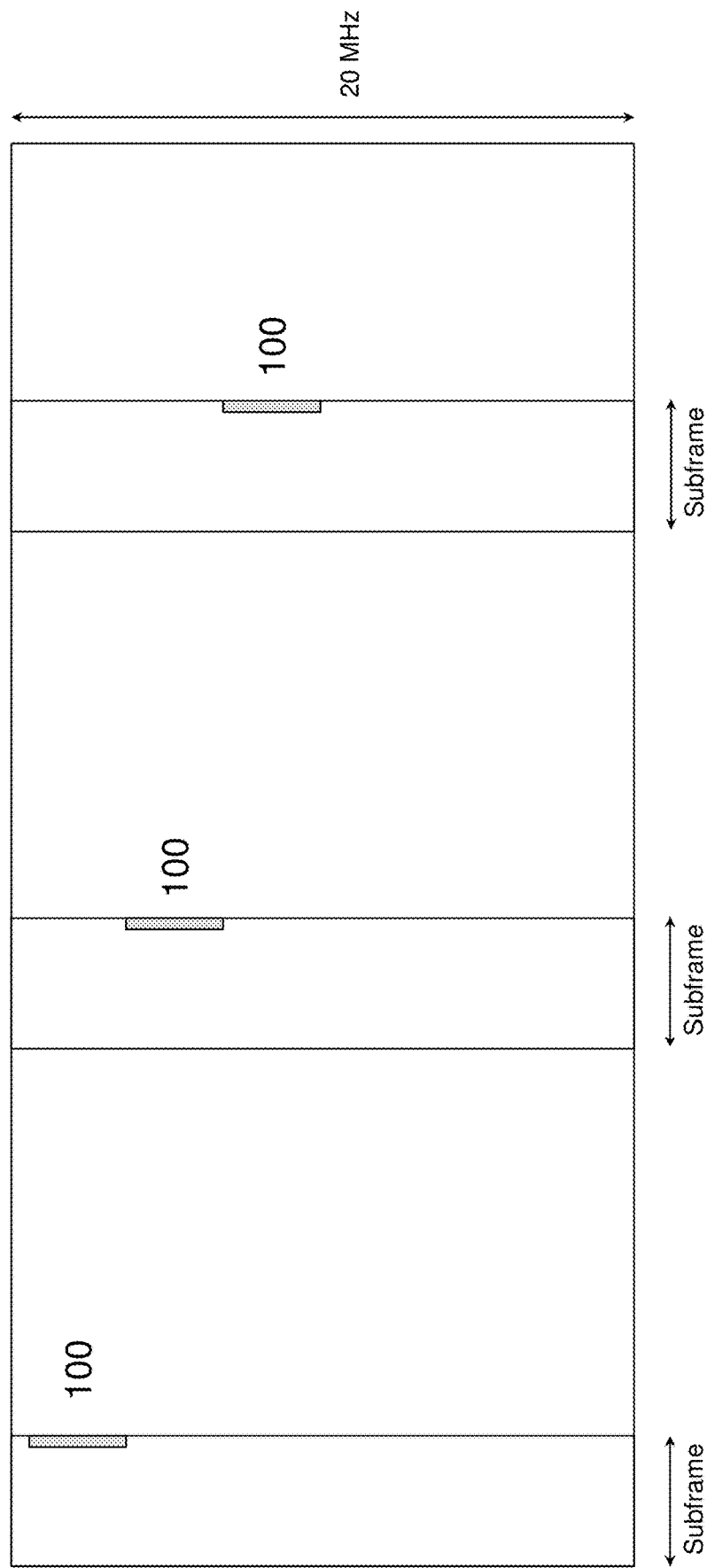

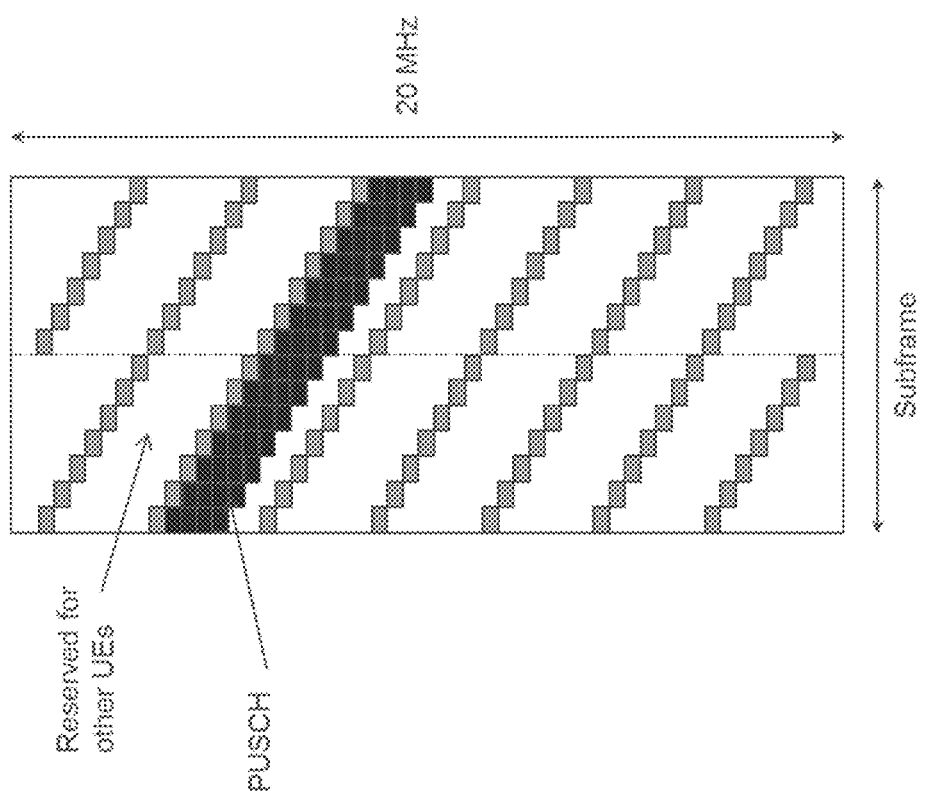

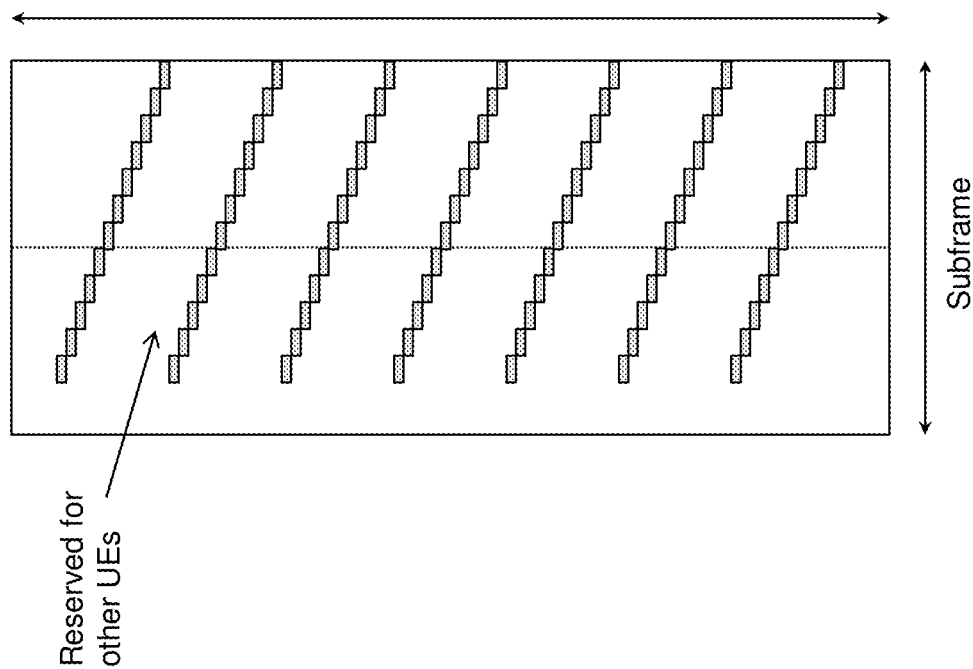

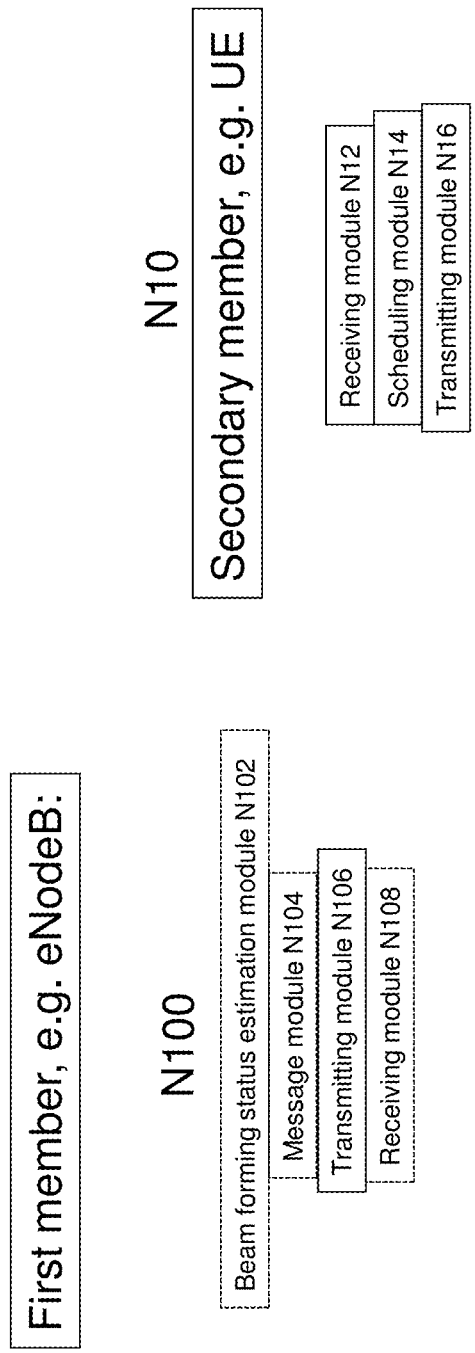

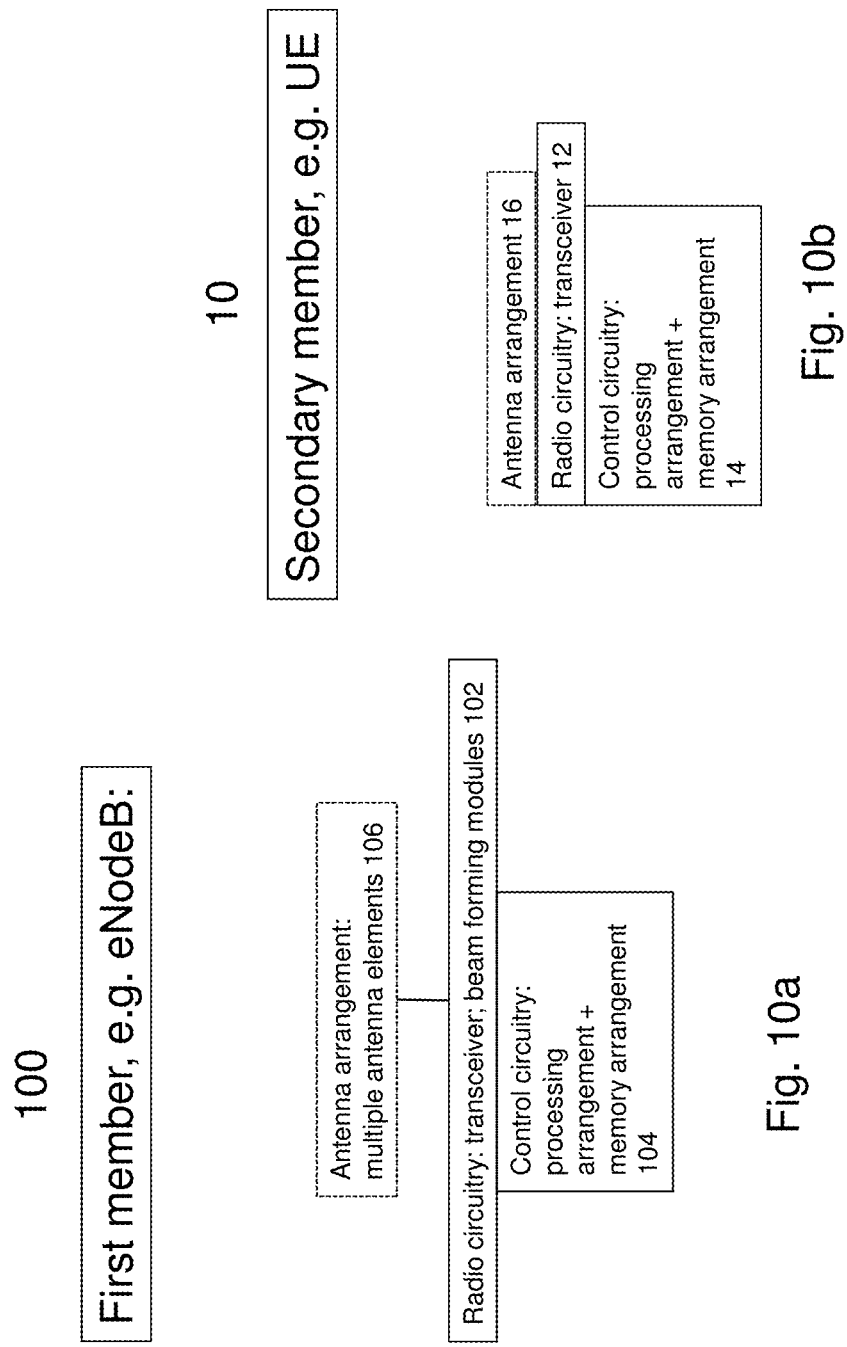

METHOD AND APPARATUSES FOR OPERATING A WIRELESS COMMUNICATION NETWORK

TECHNICAL FIELD

The present disclosure pertains to methods for operating devices or nodes in a wireless communication network and to respective devices and nodes.

BACKGROUND

For modern wireless communication networks, the use of sounding signals has been proven to be highly useful. Such sounding signals are sent from a device in the wireless communication network, e.g. a user equipment or terminal, to a radio node, e.g. an eNodeB, which may determine operation and/or transmission characteristics based on the received sounding signals. To transmit sounding signals, resources have to be scheduled.

SUMMARY

The present disclosure describes improved approaches regarding the use or scheduling of sounding signals, in particular in the context of beam forming.

There is disclosed a method for operating a wireless communication network, wherein a first member of the network transmits a scheduling message to a secondary member of the network. The secondary member receives the scheduling message and schedules sounding signal transmissions and/or a corresponding schedule based on the scheduling message. The scheduling message and/or the sounding signal schedule refers to a schedule for sounding signals based on a status of beam forming performed in the network and/or the sounding signal schedule and/or the schedule message refers to a compact schedule of sounding signals.

There is also disclosed a method for operating a first member in a wireless communication network, wherein the first member transmits a scheduling message for a secondary member of the network. The scheduling message refers to a schedule for sounding signals based on a status of beam forming performed in the network and/or the scheduling message refers to a compact schedule for sounding signals.

Moreover, a method for operating a secondary member in a wireless communication network is disclosed, wherein the secondary member receives a scheduling message from a first member. The secondary member schedules sounding signal transmissions and/or a corresponding schedule based on the scheduling message. The scheduling message and/or the sounding signal schedule refers to a schedule for sounding signals based on a status of beam forming performed in the network and/or the scheduling message and/or schedule refers to a compact schedule for sounding signals.

A first member for a wireless communication network is disclosed, the first member being adapted for transmitting a scheduling message for a secondary member. The scheduling message and/or the sounding signal schedule refers to a schedule for sounding signals based on a status of beam forming performed in the network and/or the scheduling message refers to a compact schedule for sounding signals.

Furthermore, a secondary member for a wireless communication network is disclosed, the secondary member being adapted to receive a scheduling message from a first member. The secondary member is further adapted to schedule sounding signal transmissions and/or a corresponding schedule based on the scheduling message. The scheduling message and/or the sounding signal schedule refers to a schedule for sounding signals based on a status of beam forming performed in the network and/or the scheduling message refers to a compact schedule for sounding signals.

There is also disclosed a storage medium storing instructions executable by a processing arrangement of a member of a network, the instructions causing the member to perform one of the methods disclosed herein, wherein optionally the member may be a first member or a secondary member, and the method may be one of the methods of operating the corresponding member as described herein.

An arrangement for a wireless communication network is disclosed, the arrangement comprising at least one of the devices described herein and/or being adapted to perform at least one of the methods described herein.

The suggested approaches allow adapting the scheduling of sounding signals to a wide range of conditions, in particular to conditions in which beam forming is prevalent. In particular, adapting the sounding signal schedule to be based on the beam forming status allows to lower or limit delays in receiving sounding signals. Using a compact schedule for sounding signals can ensure that the sounding signals are kept in a compact time frame, which may in particular be useful when using sweeping beams, but may also be advantageous in conditions without beam-forming, e.g. high-load conditions.

BRIEF DESCRIPTION OF THE DRAWINGS

FIG. 4 shows sounding sub bands;
FIG. 6 shows an example arrangement of signals in a subframe;
FIG. 7 shows an example of a punctured arrangement of sounding signals in a subframe;
FIGS. 9 (9a and 9b) shows an example of a first member and a secondary member, respectively;
FIGS. 10 (10a and 10b) shows another example of a first member and a secondary member, respectively.

DETAILED DESCRIPTION

Antenna beam forming is the technique of shaping antenna radiation pattern into desired forms, for example beams, and may be performed in transmitting and/or receiving. Radiation beams from antennas can be used to concentrate the transmitted/received signal energy or power and/or to steer it in specific directions. With the advancements of modern antenna techniques this area is garnering increased attention. Especially within the emerging 5G standard for mobile communication, this area receives a lot of focus.

Figure 1:
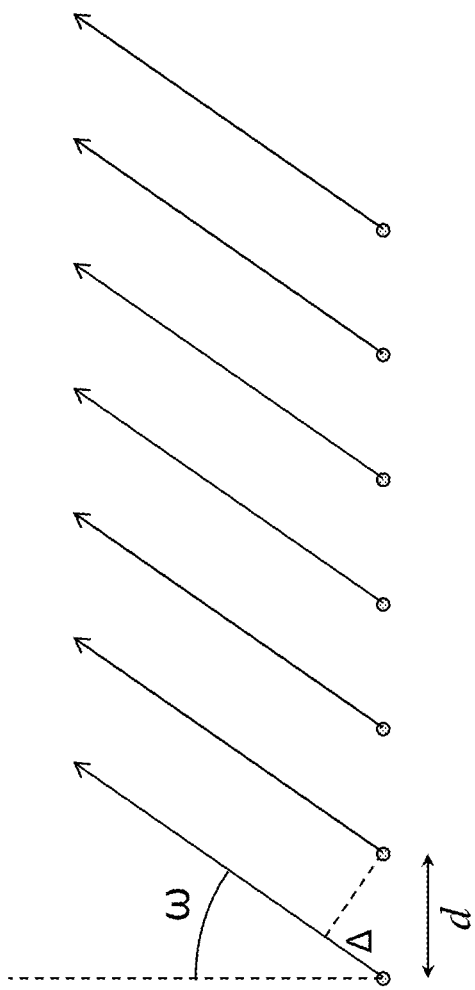
FIG. 1 shows a basic setup for beam forming.
Figure 2:
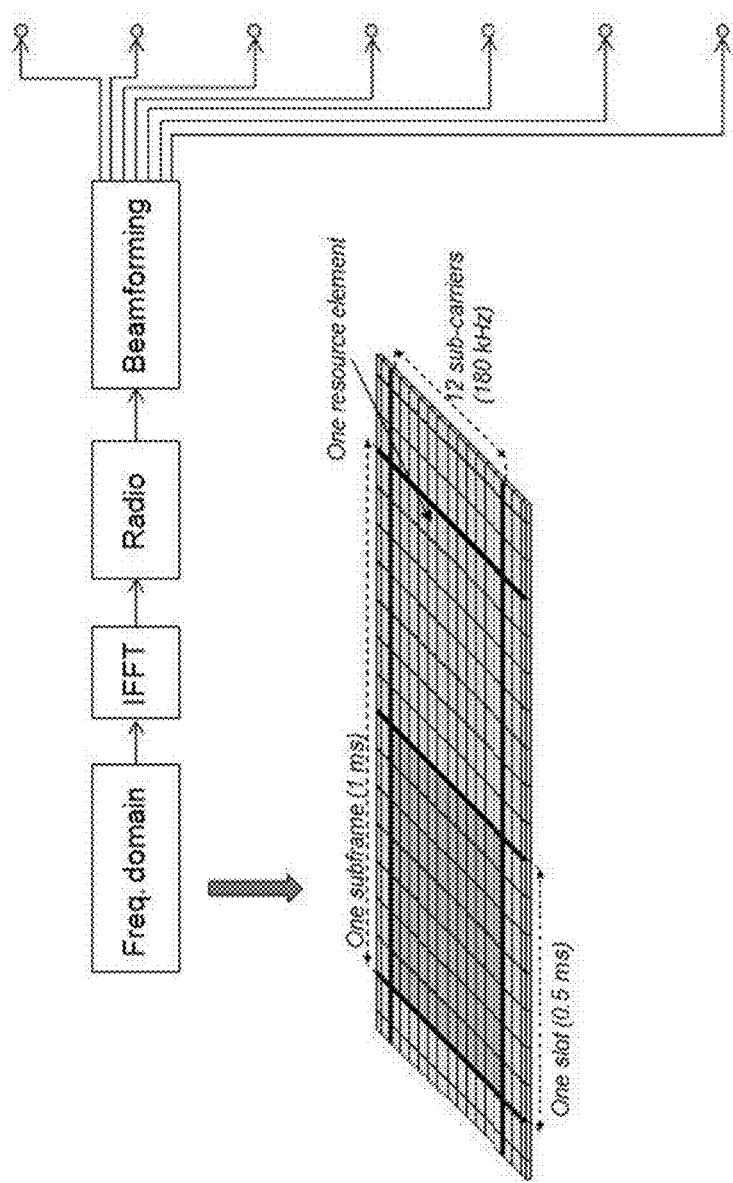
FIG. 2 shows an example of analog beam forming.

Beam forming (steering/shaping) is typically achieved by using an array antenna consisting of several distinct antenna elements. These can be laid of physically along a line (1-dimensional) or arranged in a 2-dimensional grid. FIG. 1 schematically shows a one-dimensional array.

The actual forming (steering/shaping) of a beam may be achieved by altering the phase and/or amplitude of the signals transmitted from (or received at) the individual antenna elements of an antenna arrangement so that they are combined constructively in the desired direction.

FIG. 1 depicts an example where a linear array is used to steer the beam in an angle of ω° off-axis compared to the orientation of the array.

In order for the waveforms from two antennas to superimpose constructively in that direction, the phase rotation difference of the two signals due to the path distance difference Δ must correspond to an integer multiple of 2π. This requirement leads to the expression for the phase angle that is given in the figure, which is a function of steering angle, array element distance, and wavelength.

For the sake of simplicity, the following discussion treats transmit-side beam forming. The concept is analogous on the receive side, only "backwards" in that wave energy is received instead of transmitted.

In a simple transmission system, there may be arranged a radio or radio circuitry adapted to produce a time-domain signal that is fed to a transmit antenna arrangement, which may comprise a plurality of different antenna elements. The conceptually simplest way to implement beam forming is to add a "beam forming module" between the radio and the antenna, which comprises an arrangement of individually controllable antenna elements, for example an array of some configuration.

The beam forming module may take the time-domain signal from the radio or radio circuitry and may multiplex it over all antenna elements. In order to achieve the desired beam forming, the signals to different antenna elements may each have different phase and/or amplitude, e.g. altered and/or shifted by the beam forming module. This corresponds to complex multiplications if the time-domain samples are also complex.

Note that this approach of creating beam forming/steering produces the same beam (e.g. in terms of spatial dimensions and temporal behavior) for the entire frequency band over which the signal is defined, since it is the time-domain signal that is altered on its way to the different antenna elements.

This method may be called "analog beam forming", although the term "time-domain beam forming" may also be used.

Figure 3:
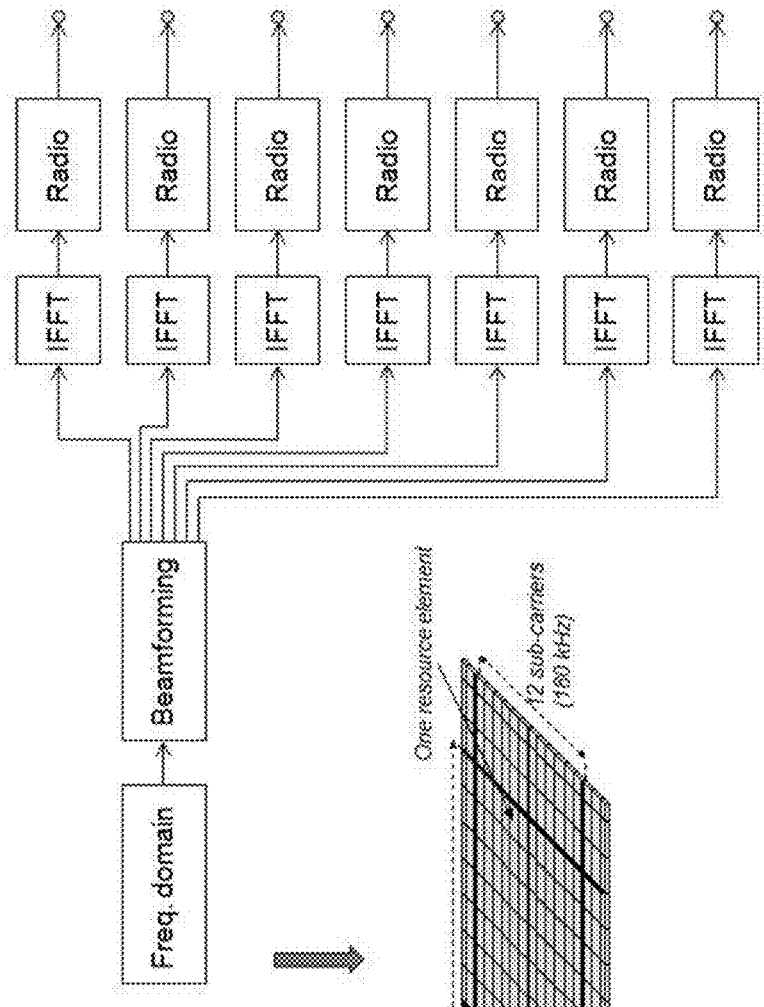
FIG. 3 shows an example of digital beam forming.

An alternative approach to beam forming is to apply phase and amplitude adjustments in the frequency domain. This is often called "digital beam forming". Refer to FIG. 3 for an illustration of this. As an example, the time/frequency grid of an OFDM-based system is shown, in this case an LTE system. The data to be transmitted is mapped as complex numbers to each subcarrier in an OFDM symbol, which is then transformed to the time-domain via an IFFT, e.g. utilizing a suitably adapted IFFT processing circuitry, before it is passed to the radio or radio circuitry.

To implement beam forming in the frequency domain, individual beam forming modules may be inserted in front of the IFFT or respective circuitry of the individual antenna elements. This may allow access to the individual subcarriers of the frequency bandwidth or carrier frequencies to be transmitted; thus, beam forming adjustments may be applied individually per subcarrier, allowing different beams to be formed for different subcarriers.

Accordingly, beam forming may be made user- and/or channel-specific. If a member of a wireless communication network like a user equipment (UE) is scheduled on a number of resource blocks, the subcarriers in these resource blocks may all be given the adjustments that make them belong to the same beam pointing at this UE and/or member and/or beam forming may be performed such that the subcarriers of the resource blocks assigned to the same member or user equipment essentially form the same beam and/or are subjected to the same alignments of phase and/or amplitude.

The increased flexibility of this approach requires, since the data streams going to the different antenna elements are created in the frequency domain, that individual antenna elements have associated to them their own IFFT processing circuitry and radio circuitry, which means an increase in processing requirement and HW complexity compared to a time-domain beam forming approach. Hence, broadly speaking, the choice between time- or frequency-domain beam forming may be a performance/flexibility vs. processing capacity/complexity trade-off.

In the context of this disclosure, a first member for and/or of a wireless communication network generally may be a member of and/or for a network as described, in particular a node of the network, e.g. a base station and/or eNodeB. Generally, a first member may be defined by being able to and/or be adapted to receive and/or process sounding signals from one or more than one secondary members. It may be considered that a first member is adapted to control beam forming for an antenna arrangement. The beam forming may be for transmitting and/or receiving.

The first member may be connected or connectable to an antenna arrangement. The antenna arrangement generally may comprise a plurality of antenna elements, which may be individually controllable by the first member, in particular to perform beam forming.

The antenna arrangement may be implemented as part of the first member. The first member and/or the antenna arrangement may be adapted to perform time-domain beam forming and/or frequency-domain beam forming, e.g. by comprising one or more beam forming modules and/or beam forming circuitry and/or IFFT circuitry adapted to allow time-domain and/or frequency-domain beam forming, e.g. as described herein.

Generally, a secondary member for and/or of a wireless communication network may be and/or comprise a member for and/or of a wireless communication network, which may be defined by being able to and/or be adapted to transmit sounding signals to a first member and/or as being a target of a beam formed by a first member.

A secondary member may for example be a user equipment or a relay node or a sub-macro node, e.g., a pico or femto node. The secondary member may be connected or connectable to a secondary antenna arrangement. The secondary antenna arrangement generally may comprise one or a plurality of antenna elements. In the case of a plurality of antenna elements, these may be individually controllable by the secondary member, in particular to perform beam forming.

The secondary antenna arrangement may be implemented as part of the secondary member, e.g. in the housing of a user equipment. The secondary member and/or the secondary antenna arrangement may be adapted to perform time-domain beam forming and/or frequency-domain beam forming, e.g. by comprising one or more beam forming modules and/or beam forming circuitry and/or IFFT circuitry adapted to allow time-domain and/or frequency-domain beam forming, e.g. as described herein.

A first member and a secondary member may be wirelessly connected or connectable for wireless communication utilizing at least one channel having Resource Blocks assigned to it, e.g. by the first member or generally a suitable node, for example a base station and/or an eNodeB (eNB). A frequency bandwidth may be assigned to the channel, which may comprise one or more than one sub bands, in particular at least 5 sub bands and/or 10 sub bands and/or 14 or more sub bands. There may be different channels defined for Uplink and Downlink communication. Signaling between the first member and the secondary member or secondary members may be divided in time division units and subunits, e.g. in frames, which may be divided into sub frames, which may again be subdivided into slots. Each time division unit may be assigned a predetermined time interval, for example according to a standard used. Signals may be transmitted and received in symbols, in particular OFDM symbols. A bandwidth may be assigned to a carrier.

Scheduling of the signals between members and/or resource allocation may generally be performed by a suitable node of the network, e.g., the first member and/or a base station and/or an eNB. Scheduling information and/or information regarding the grant of resources may be transmitted by and/or from the node to the respective members via suitable signaling, e.g. according to the standard used. One or more different messages may be uses for such transmissions and/or signaling, e.g. in the form of scheduling and/or grant messages from the allocating node, e.g. the first member, to a respective secondary member.

Beam forming by the first member may in particular be in reception, e.g. of sounding signals from the secondary member. The first member may be aware of their schedule and/or the secondary member may be aware of the beam forming performed by the first member and schedule its sounding signals accordingly. Beam forming by the secondary member may in particular be in transmission, e.g. for transmitting sounding signals, which may be based on and/or according to a sounding signal schedule. Scheduling sounding signals may determine and/or defined a sounding signal schedule.

In a mobile or wireless communication system or network there is typically some solution for estimating the radio channel properties of the uplink (UL; communication in the other direction may be called Downlink (DL)), i.e., a channel from a secondary member of the network like a UE to a first member of the network, which may be a node or base station, in particular an eNodeB.

When a secondary member like a UE is not transmitting data on a certain part of the spectrum, or not transmitting at all, the first member eNB (eNodeB, a base station according to LTE) may require information regarding the properties or quality of the UL channel to facilitate good scheduling decisions for upcoming uplink data transmissions. A possible approach may be called sounding.

Sounding may involve sending one or more sounding signals, e.g. pre-defined or predetermined signals and/or pilot signals and/or Sounding Reference Signals, the form of which may depend on the standard used for the network, from the secondary member to the first member.

Such signals may allow the first member to estimate the channel properties and/or signal strength of the communication channel and/or of the wireless connection used, e.g. due to the signal strength and/or sequence and/or scheduling of outgoing sounding signals being known and/or obtainable and being comparable with corresponding received signals by the first member.

Sounding signals generally may have predetermined sounding parameters with which they are transmitted, e.g. signal strength and/or amplitude and/or sequence and/or timing. The predetermined parameters may be known and/or obtainable by a first member. A sounding signal may be transmitted on a specific sub band to sound this sub band. Sounding a sub band may refer to transmitting a sounding signal on a sub band.

Generally, sounding signals may be adapted and/or predetermined to allow the first member to obtain channel state information describing the status and/or quality of the wireless connection of the channel used for communicating with the secondary member in particular for the Uplink connection.

For example, in LTE (Long-Term Evolution, a telecommunications standard) this is achieved by having a secondary member of the network like a UE transmit so-called Sounding Reference Symbols (SRS); such Sounding Reference Symbols may be seen as examples of sounding signals, other examples of which may comprise pilot signals adapted and/or utilized for channel estimation. These can be transmitted, per transmit antenna, on every other subcarrier (subband) over the entire bandwidth, but several more spectrum-conservative options also exist where only a smaller sub band is sounded in a given OFDM symbol. The location of this smaller sub band may then "hop around" in the spectrum with each new transmission of sounding signals like sounding reference symbols (at later time instances) so that eventually the entire spectrum has been covered after several such transmissions.

A channel generally may comprise one or more sub bands and/or one or more Resource Blocks (RB).

The first member may generally comprise estimation circuitry adapted to measure and/or obtain data representing parameters like a signal strength of received signals, in particular sounding signals, and/or comparison circuitry being adapted to compare the signal strength of a received signal, in particular of a sounding signal, with an expected signal strength for that signal and/or with strength of the signal at the secondary member transmitting it. Estimation circuitry and/or comparison circuitry may be implemented as part of control circuitry and/or its functionality may be provided by control circuitry. It may be considered that estimation circuitry and/or comparison circuitry is adapted to estimate and/or measure and/or obtain and/or compare other predetermined sounding parameters.

A secondary member may have access to and/or comprise and/or obtain a schedule according to which sounding signals are to be transmitted. Sounding signals may be transmitted, by the secondary member, and/or according to a schedule, in response to a sounding message received by the secondary member by a first member. The first member may be adapted to control its own transmission and/or reception based on sounding signals, e.g. by setting suitable power levels for transmission and/or by controlling and/or switching on or off beam forming based on received sounding signals and/or their signal strength.

Alternatively and/or additionally, the first member may be adapted to control one or more secondary members based on sounding signals, e.g. by determining and/or transmitting corresponding control and/or scheduling and/or grant messages based on sounding signals.

The reason for sounding only a sub band may be to leave room for other secondary members like UEs to also transmit SRS or sounding signals or to concentrate the transmitted energy to a narrower band in order to achieve better coverage. FIG. 4 shows the principle of sounding sub bands as it appears in LTE Rel 8. A sub band may be sounded during the last OFDM symbol of certain sub frames, which may appear at a preconfigured periodicity (or triggered by the eNB).

Different types of signals in UL may be prioritized differently. For example, for prioritizing what is transmitted in UL, one can note the following regarding LTE. In the case of a special uplink sub frame, which is constructed due to a TDD DL-to-UL shift, one or several of the first OFDM symbols of the UL sub frame is punctured. Hence, no UL transmission of any kind can take place in those symbols.

PRACH (Physical Random Access Channel) transmission has higher priority than SRS, which means that SRS must not be transmitted on resources reserved for PRACH.

SRS has higher priority than PUSCH (Physical Uplink Shared Channel), which means that PUSCH must be not be transmitted on resources reserved for SRS and/or PRACH.

For other wireless communication networks and/or standards, there may be similar or other prioritizations.

In particular for time-domain beam forming, the entire frequency bandwidth for transmitting to a secondary member of the network like a UE (target or secondary member) may be included in the same beam, pointing in one direction, namely at a target secondary member.

The first member like a node, base station or eNodeB (eNB) may only be able to measure one beam and one sub band in one OFDM symbol per beam formed time-domain signal. To cover multiple beams and the full bandwidth, many sub band transmissions with sounding signals from the UE may be needed.

This may introduce delays in the sounding and is power consuming for the battery-driven secondary member like a UE or a terminal. Moreover, in cases in which the secondary member like a UE is non-stationary, a delay may cause the channel estimated from the sounding, e.g. via SRS, to be outdated depending on the speed of the secondary member.

A first member like a base station or eNB may generally be equipped to be able to receive multiple receive paths and/or be adapted to be able to form more than one beam. Such a first member may receive in multiple, but limited, simultaneous directions at the expense of HW complexity and physical footprint.

A beam forming first member transmitting and/or receiving at least one beam, e.g. an eNB or base station, may be adapted to sweep the at least one beam along a path and/or in different directions over time, in particular during a frame and/or a sub frame of signaling, which may comprise UL and/or DL communication. In this case, the first member may receive OFDM symbols from different beam directions. In particular, sounding signals like SRS from a certain secondary member like a UE may be received in only one, or a very limited number of, OFDM symbols, thus yielding channel information over only a (small) sub band.

A similar and/or additional delay may occur if the secondary member is performing beam forming transmission (beam-specific SRS) and is sweeping the beam direction of its SRS transmission, in particular for time-domain beam forming. Only one or a few of the beams may be picked up by the first member like a eNB, which may result in incomplete sounding signal information or channel state information and increased delay of acquiring sounding signal information or channel state information of the uplink channel.

It is suggested herein base the sounding signal schedule on a beam forming status and/or to use sounding signals, e.g. SRS, that are generally sparsely spread out, and/or are arranged as compact signals, over the entire bandwidth, so that for example a beam may sound and/or sample the entire bandwidth. In this way the need for frequency hopping is reduced, which will lead to shorter channel acquisition times and/or more reliable estimates of channel states.

Hence, the first member like an eNB may obtain channel quality information about the entire UL bandwidth, which may be subsampled, when using beam forming and beam sweeping, in particular in the case of time-domain beam forming. The time to sound the whole channel is shortened, which is useful, particularly in non-stationary channel environments.

Figure 5B:
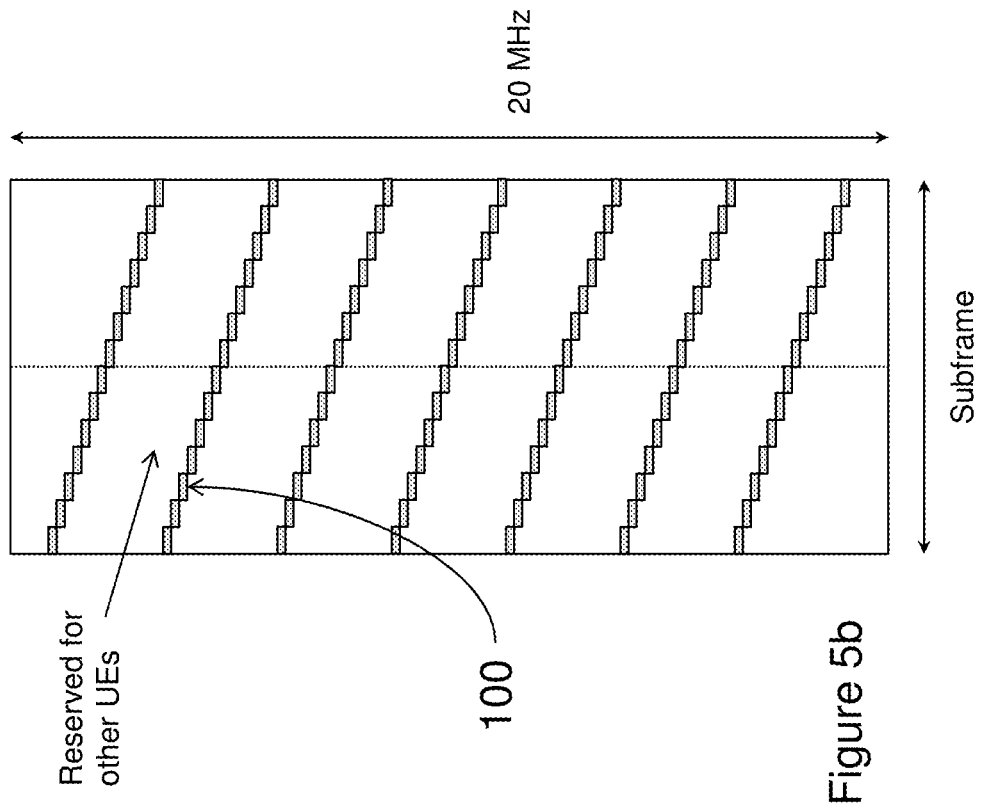
FIGS. 5 (5a and 5b) shows arrangements of sounding signals in a subframe.
Figure 5A:
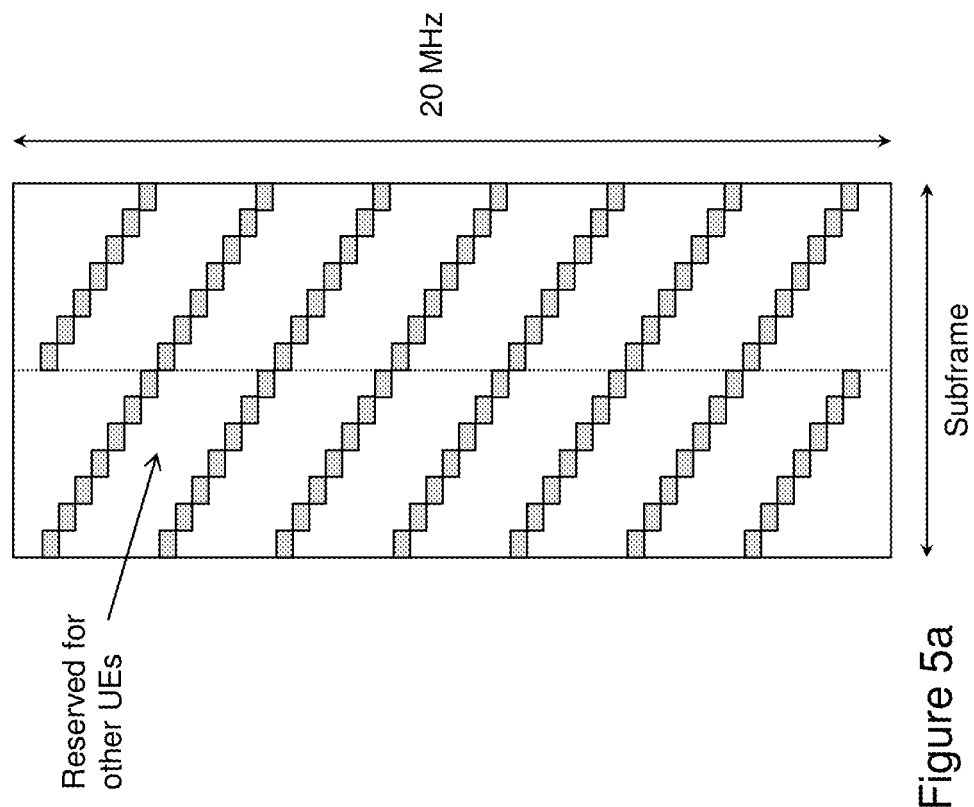

The part of the spectrum that is sounded in each OFDM symbol/beam may be spread over almost the entire UL bandwidth. This may be achieved by using a signal layout as depicted in FIG. 5. FIG. 5a shows an example where the full bandwidth is actually fully sounded in the first slot of the sub frame and this is then repeated in the second slot. FIG. 5b shows a sounding scheme where the whole sub frame is used to sound the full bandwidth.

For example, in LTE the number of PRBs (Physical Resource Block) in a 20 MHz carrier defining a bandwidth of a channel is 100. By dividing these into 7 sub bands of 14 PRBs each, the sounding with sounding signals 100 will cover 98 of the PRBs. In FIG. 4, where "traditional" sub band sounding is depicted, these 14 PRBs are consecutively laid out in the frequency domain and distributed over several sub frames.

It is suggested to provide a compact signal arrangement of sounding signals by for example spreading them out as depicted, for example, in FIG. 5a. Here, fractions of the sub bands used above, consisting of only 2 PRBs, are evenly distributed over almost all of the UL bandwidth. This pattern is then slightly offset for each new OFDM symbol such that after the sounding of 7 symbols all 98 PRBs covered with the traditional method are sounded.

However, in each analog beam (=one OFDM symbol) a subsampling of the full bandwidth is obtained. This can then be utilized by the secondary member, for example an eNB, to get channel state information or corresponding measurements quicker for many beams instead of more detailed measurements for a few beams during a given measurement period.

In a sub frame where such SRS as in FIG. 5 is transmitted from one secondary member, e.g. a UE, there may be a simultaneous PUSCH transmission from another UE. To avoid interference between the UE transmitting SRS and another UE transmitting PUSCH, the PUSCH resource allocation can also be shifted, by the same shift pattern as the SRS. For instance, if a UE is scheduled in a set of PRBs in the first OFDM symbol in the first sub band, it will in the next OFDM symbol shift the PUSCH resource allocation and also the associated uplink reference signals with the same amount as the SRS, per OFDM symbol as to avoid interference. See also FIG. 6.

The secondary member, in this case the UE, may be informed (e.g., by the first member, for example using a message, e.g. an uplink grant message, to the secondary member and/or configuring the secondary member accordingly) whether a shifted PUSCH or a non-shifted PUSCH is used in the sub frame (in case the sub frame does or does not contain SRS transmissions, respectively) and also which SRS configuration to apply from the uplink grant scheduling message. Note that no additional resource allocation information may be needed since the shift per OFDM symbol follows the same shift as the SRS.

In case an uplink grant resource allocation is scheduled at the edge of the bandwidth, the PUSCH resource allocation may wrap around to the other edge in the second slot, compared to the first slot.

Additional control information may added to a uplink scheduling grant message, so the UE transmits PUSCH data on one or several scheduled SRS resources. The spectrum can then be fully utilized without interfering with any parallel sounding reference signals.

Alternatively or additionally, the same secondary member like a UE may transmit both SRS and PUSCH, avoiding self-interference by shifting the PUSCH resource allocation in the same manner as the SRS. This may be based on a message received from the first member.

Also alternatively or additionally, the UE may transmit PUSCH on a non-shifted PUSCH allocation, but avoid interference by the SRS by rate-matching the PUSCH transmission around the SRS locations in the cell, which may potentially contain SRS from itself and/or other UEs.

It may be considered that the SRS is punctured in any time-frequency interval which is allocated to PRACH.

A special uplink sub frame may be constructed due to TDD DL-to-UL shift, based on a control message from a suitable node, e.g. the first member and/or a base station and/or an eNB. In this case, the SRS can be punctured such that the SRS in one or several of the first OFDM symbols of a sub-frame are punctured. Alternatively, the SRS transmission pattern is changed such that more REs are sounded in each remaining OFDM symbol of that special sub frame (see FIG. 7).

The cases of scheduling and allocation described above may involve a node, in particular the first member, performing corresponding allocating and/or scheduling and/or transmitting one or more corresponding messages to the secondary member. The first member may comprise a corresponding allocating module for allocating and/or scheduling resources for one or more secondary members. This module may be implemented in the control circuitry, in particular in hardware and/or software and/or firmware.

The secondary member may be adapted to receive the one or more messages and/or to schedule and/or transmit in response and/or based on one or more received messages.

Figure 8:
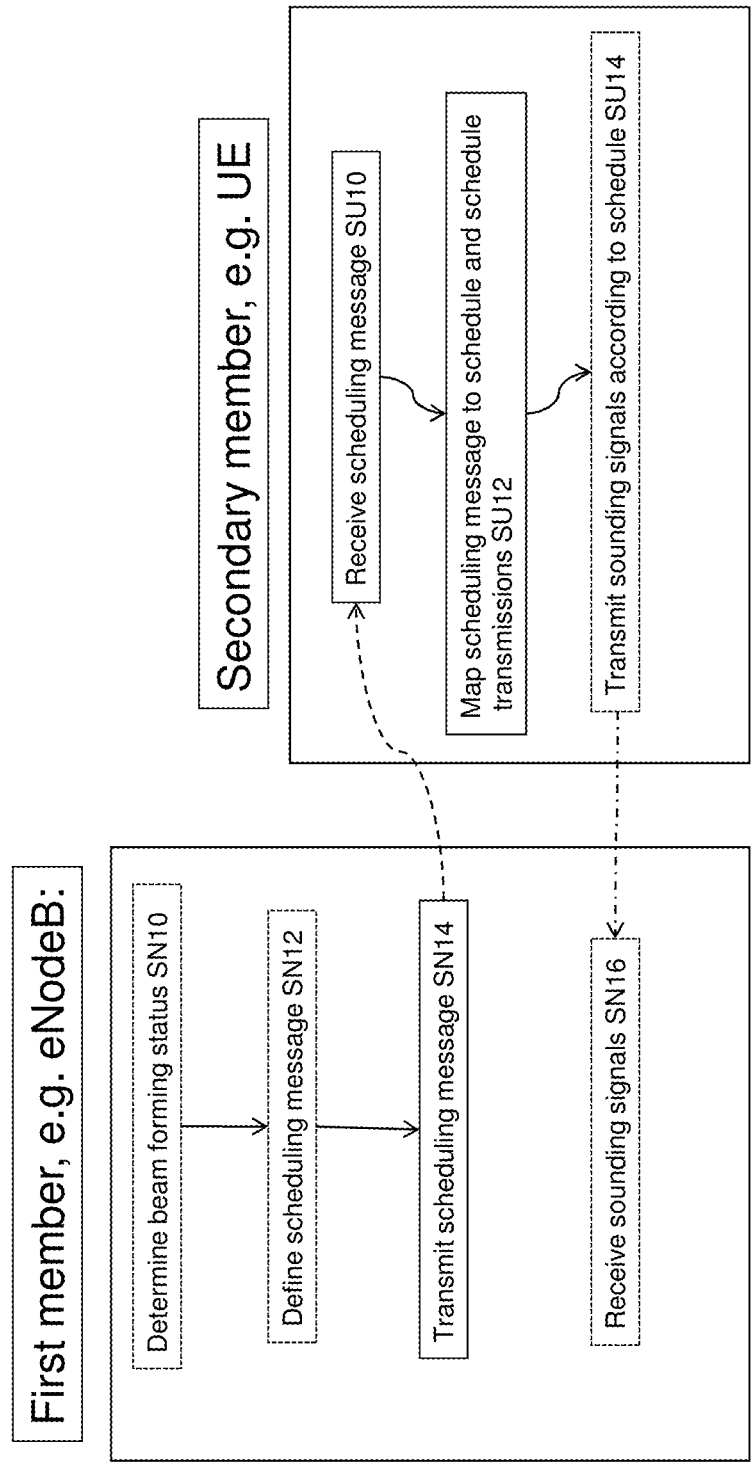
FIG. 8 shows an example a flow diagram of operating a first and a secondary member.

FIG. 8 schematically shows a flow diagram for operating a first member and a secondary member, respectively. The first member, which may e.g. be an eNodeB, may in an action SN10 determine a beam forming status of the network, in particular whether it or the secondary member performs beam forming. Based on this, it may define a scheduling message (which may be or comprise an uplink grant message) in action SN12. The scheduling message may additionally or alternatively be based on other parameters or conditions, e.g. a movement status of the secondary member relative to the first member. For example, the scheduling message may be defined to refer to a compact schedule if beam forming is performed and/or the movement relates to a high relative speed. The first member may in action SN14 transmit the scheduling message to the secondary member, e.g. a user equipment, which may receive it in an action SU10.

In response to the received scheduling message, the secondary member may schedule transmissions based on the scheduling message in an action SU12. Optionally, it may map information of the scheduling message referring to a schedule to be used to a schedule, which e.g. may be stored in a memory accessible to the secondary member and/or its control circuitry. Optionally, in an action SU14, sounding signals may be transmitted according to the schedule to the first member.

The first member in an optional action SN16 may receive the sounding signals and optionally evaluate them, e.g. by estimating and/or measuring them and/or comparing them with predetermined parameters, for example to determine the channel quality.

FIG. 9 schematically shows corresponding modules of the respective members having the functionality referred to in FIG. 8. A first member N100 shown in FIG. 9a may optionally comprise a beam forming status estimation module N102, e.g. for performing action SN10. The first member may comprise a message module N104 for performing action SN12, as well as a transmitting module N106 for performing action SN14. Optionally, first member N100 may comprise a receiving module N108 for performing action SN16.

The secondary member N10 shown in FIG. 9b may comprise a receiving module N12 for performing action SU10. It may be considered that secondary member N10 comprises a scheduling module N14 for performing action SU12. Secondary member N10 may comprise a transmitting module N16 for performing action SN16.

FIG. 10 schematically shows basic components of the first member and the secondary member, for example of FIGS. 8 and 9. The first member 100 may comprise radio circuitry 102, which may include at least one receiver and/or transmitter and/or transceiver and optionally one or more than one beam forming modules. The radio circuitry 102 may be controllable by control circuitry 104 of the member, which may comprise a processing arrangement and a memory arrangement. The radio circuitry 102 may be connected to an antenna arrangement 106, which may comprise a plurality of antenna elements which may be individually controllable by the radio circuitry and/or the control circuitry to provide beam forming. Generally, controlling the antenna arrangement or its elements by the radio circuitry may refer to feeding the arrangement or its elements with signals and/or sampling the arrangement or its elements in a defined manner.

The secondary member 10 may comprise radio circuitry 12, e.g. a transceiver and/or transmitter and/or receiver, controllable by control circuitry 14 of the secondary member comprising a processing arrangement and a memory arrangement of the secondary member 10. In this example, an antenna arrangement 16 is part of the secondary member 10. In other cases it may be connected or connectable to the secondary member 10 as a separate device. It may also be considered that the antenna arrangement 16 comprises multiple antenna elements for beam forming, and that the radio circuitry 12 of the secondary member is correspondingly adapted, by having one or more beam forming modules.

As described herein, the sounded spectrum or the sounded part of the bandwidth may be spread out over essentially the entire UL bandwidth, allowing e.g. compensating for the fact that time-domain beam forming can only point in one direction at a time. This approach may also be of particular advantage for cases in which the secondary member is moving with a high velocity relative to the first member, as in this case delayed sounding might lead to outdated channel information.

In the context of this specification, there are described:
A. A Method for operating in a wireless communication network, wherein
a first member of the network transmits a scheduling message to a secondary member of the network;
the secondary member receives the scheduling message; and
the secondary member schedules sounding signal transmissions and/or a corresponding schedule based on the scheduling message;
wherein the scheduling message and/or the sounding signal schedule refers to a schedule for sounding signals based on a status of beam forming performed in the network and/or wherein the sounding signal schedule and/or the schedule message refers to a compact schedule of sounding signals.

B. A method for operating a wireless communication network, wherein
a first member of the network transmits a scheduling message to a secondary member of the network;
the secondary member receives the scheduling message; and
the secondary member schedules sounding signal transmissions and/or a corresponding schedule based on the scheduling message;
wherein the sounding signal schedule and/or the schedule message refers to a compact schedule of sounding signals.

C. Method for operating a first member in a wireless communication network, wherein the first member transmits a scheduling message for and/or to a secondary member of the network, wherein the scheduling message refers to a schedule for sounding signals based on a status of beam forming performed in the network and/or wherein the scheduling message refers to a compact schedule for sounding signals.

D. Method for operating a first member in a wireless communication network, wherein the first member transmits a scheduling message for and/or to a secondary member of the network, wherein the scheduling message refers to a compact schedule for sounding signals.

E. Method for operating a secondary member in a wireless communication network, wherein the secondary member receives a scheduling message from a first member; and the secondary member schedules sounding signal transmissions and/or a corresponding schedule based on the scheduling message; wherein the scheduling message and/or the sounding signal schedule refers to a schedule for sounding signals based on a status of beam forming performed in the network and/or wherein the scheduling message and/or schedule refers to a compact schedule for sounding signals.

F. Method for operating a secondary member in a wireless communication network, wherein the secondary member receives a scheduling message from a first member; and the secondary member schedules sounding signal transmissions and/or a corresponding schedule based on the scheduling message; wherein the scheduling message and/or schedule refers to a compact schedule for sounding signals.

G. A first member for a wireless communication network, the first member being adapted for transmitting a scheduling message for and/or to a secondary member; wherein the scheduling message and/or the sounding signal schedule refers to a schedule for sounding signals based on a status of beam forming performed in the network and/or wherein the scheduling message refers to a compact schedule for sounding signals.

H. A first member for a wireless communication network, the first member being adapted for transmitting a scheduling message for and/or to a secondary member, wherein the scheduling message refers to a compact schedule for sounding signals.

I. A secondary member for a wireless communication network, the secondary member being adapted to receive a scheduling message from a first member; and further being adapted to schedule sounding signal transmissions and/or a corresponding schedule based on the scheduling message; wherein the scheduling message and/or the sounding signal schedule refers to a schedule for sounding signals based on a status of beam forming performed in the network and/or wherein the scheduling message refers to a compact schedule for sounding signals.

J. A secondary member for a wireless communication network, the secondary member being adapted to receive a scheduling message from a first member; and further being adapted to schedule sounding signal transmissions and/or a corresponding schedule based on the scheduling message; wherein the scheduling message refers to a compact schedule for sounding signals.

K. The method or device according to any one of the preceding letters, wherein the secondary member is a user equipment or a relay node and/or the first member is node of the network, in particular a base station and/or a macro-node and/or an eNodeB.

L. The method or device according to any one of the preceding letters, wherein the wireless communication network is a radio access network, in particular a radio access network according to UTRAN and/or E-UTRAN and/or LTE and/or the sounding signals are SRS.

M. The method or device according to any one of the preceding letters, wherein the first member is adapted to perform beam forming and/or performs beam forming, in particular time-domain beam forming.

N. The method or device according to any one of the preceding letters, wherein a or the first member is adapted to perform beam forming such that a beam includes and/or sweeps over to include at least for a time interval the secondary member and/or performs such beam forming, in particular time-domain beam forming.

O. The method or device according to any one of the preceding letters, wherein a or the secondary member is adapted to perform beam forming and/or performs beam forming, in particular time-domain beam forming.

P. The method or device according to any one of the preceding letters, wherein a or the secondary member is adapted to perform beam forming such that a beam includes and/or sweeps over to include at least for a time interval the first member and/or performs such beam forming, in particular time-domain beam forming.

Q. The method or device according to any one of the preceding letters, wherein the schedule of sounding signals is based upon the shape and/or sweeping trajectory of a beam formed by a or the first member and/or a or the secondary member.

R. The method or device according to any one of the preceding letters, wherein the schedule is a compact schedule.

S. The method or device according to any one of the preceding letters, wherein the schedule is a compact schedule essentially providing sounding of a bandwidth of a carrier or channel in a compact timeframe, which may be one or a few sub frames, in particular fewer than 4 sub frames.

T. The method or device according to any one of the preceding letters, wherein the schedule is a compact schedule providing and/or scheduling sounding signals covering at least 50% and/or at least 60% and/or at least 75% and/or at least 90% of the sub bands and/or resource blocks of the bandwidth or carrier within a compact timeframe.

U. The method or device according to any one of the preceding letters, wherein the schedule is a compact schedule scheduling a pattern repeatedly over a compact timeframe.
V. The method or device according to any one of the previous letters, wherein the schedule provides scheduling of non-sounding signals, in particular PUSCH signals, which optionally may be shifted such that PUSCH signals and SRS signals do not overlap.
W. Storage medium storing instructions executable by a processing arrangement of a member of a network, the instructions causing the member to perform one of the methods of any of the preceding letters, wherein optionally the member may be a first member or a secondary member and the method may be one of the methods of operating the corresponding member as described herein.
X. Arrangement for a wireless communication network, comprising at least one of the devices of any of the preceding letters and/or adapted to perform at least one of the methods of any of the preceding letters.

In the context of this specification, a member of and/or for a wireless communication network may generally be or comprise a device adapted for wireless communication with at least one further member or device adapted for wireless communication. Wireless communication may generally refer to communication via radio waves, in particular in the context of mobile and/or cellular telecommunication. A wireless communication network may in particular be a radio access network for mobile telecommunication, in particular according to LTE and/or UTRAN and/or E-UTRAN. A member for and/or of a wireless communication network generally may comprise radio circuitry, which generally may comprise a transmitter and/or receiver and/or transceiver, the latter of which may be arranged for transmitting and receiving signals.

A member generally may comprise control circuitry to control the radio circuitry and/or operation of the member and/or the member and/or parts or components of and/or methods carried out in the member, in particular receiving and/or transmitting and/or processing of signals, e.g. by encoding and/or decoding signals and/or scheduling of signals, e.g. according to a predetermined and/or provided and/or predefined schedule, in particular the methods or parts or steps of the methods described herein.

Control circuitry may comprise a processing arrangement, which may include one or more processing units or devices adapted for controlling the member and/or radio circuitry as described herein. The processing arrangement and/or a processing unit may comprise integrated circuitry, for example at least one of a microprocessor and/or processor core and/or ASIC (Application Specific Integrated Circuit) and/or FPGA (Field-Programmable Gate Array), etc. The processing arrangement may comprise and/or be connected or connectable to a memory arrangement, which may be adapted to store data and/or instructions executable by the processing arrangement. The processing arrangement and memory arrangement may be arranged such that the processing arrangement and/or at least one processing unit may access the memory arrangement to read and/or to write, in particular to read instructions and/or corresponding data. Generally, control circuitry may comprise hardware and/or firmware and/or software, the latter of which may be executable on the hardware, which may comprise integrated circuitry as mentioned herein.

A schedule may for example be provided via a message received from another member, in particular a member higher up in the hierarchy of the network, which may be a node and/or base station and/or eNodeB.

Beam forming in a network may be performed by a member of the network, e.g. a first member; optionally, a secondary member may also perform beam forming.

Generally, a scheduling message may refer to a schedule of signals, in particular of sounding signals. A scheduling message may be determined by a suitable node or member of a wireless communication network, in particular a first member. A scheduling message may refer to a message for example by including the schedule and/or an indication and/or mapping to a schedule allowing identification of which schedule is to be used by a secondary member.

A schedule, in particular a sounding signal schedule, generally may define the timing and/or signal strength and/or sequencing and/or distribution about a bandwidth and/or resource blocks and/or time division units, in particular at least one sub frame and/or slots of signals, in particular sounding signals. It may be considered that a sounding signal schedule assigns sounding signals, in particular SRS, to resource blocks and/or slots and sub bands in one or more than one sub frame and/or defines a pattern distributing sounding signals over resource blocks and/or slots and sub bands. This may generally be referred to as scheduling by a schedule.

Generally, a schedule may pertain to communication between a first member and a secondary member utilizing the schedule, in particular in Uplink. Hence, a sounding signal schedule may in particular define the sequence and timing of sounding signals to be transmitted from the secondary member to the first member for sounding purposes.

A schedule, in particular a sounding signal schedule, may refer to more than one type of signals, e.g. sounding signals and PUSCH signals. A schedule may allow for signaling of other secondary members, for example on PUSCH, and/or punctuated sub frames and/or unused slots of a sub frame, in particular at the beginning of a sub frame. A schedule referring to a compact schedule may comprise and/or map to and/or define the compact schedule.

A compact schedule may be a schedule essentially providing or scheduling sounding of a bandwidth of a carrier or channel in a compact timeframe. A compact timeframe may refer to a time frame of one or a few time division sub units, in particular sub frames, in particular to fewer than 4, or fewer than 3 sub frames, in particular one sub frame. A compact schedule may provide and/or schedule sounding signals covering at least 50% and/or at least 60% and/or at least 75% and/or at least 90% of the sub bands and/or resource blocks of the bandwidth or carrier within the compact timeframe.

It may be envisioned that a compact schedule arranges sounding signals such that they are distributed over sub bands in a step-wise manner, for example in individual steps (per slot) between neighboring sub bands for example upwards in frequency or downwards in frequency.

A compact schedule may schedule sounding signals such that at least on sub band is sounded twice or more than twice within the compact timeframe. In particular, it may be considered that a compact schedule provides a distribution of sounding signals over sub bands repeatedly and/or more than once within the compact timeframe and/or the schedule may schedule a pattern repeatedly over a compact timeframe.

A first member may comprise a transmitting module adapted to transmit messages, in particular a scheduling message. It may be considered that a first member comprises a beam forming status estimation module for obtaining and/or determining the beam forming status. The first member may comprise a message module for defining the scheduling message, in particular such that it may refer to a compact schedule.

The first member may comprise a transmitting module for transmitting the message. Generally, a first member may comprise a receiving module for receiving signals from at least one secondary member, in particular sounding signals. It may be considered that the first member comprise an estimation module and/or a comparison module, for measuring and/or estimating received signals, in particular sounding signals, and/or to compare received signals or data based thereupon with predetermined parameters. The modules may be implemented in hardware and/or software and/or firmware, in particular within or as part of control circuitry of the first member.

A secondary member may comprise a receiving module for receiving the scheduling message. It may further comprise a scheduling module for scheduling transmissions according to the received schedule. The secondary member may additionally comprise a transmitting module for transmitting scheduled signals, which may be part of the scheduling module and/or connected to it. The modules may be implemented in hardware and/or software and/or firmware, in particular within or as part of control circuitry of the secondary member.

A member, in particular a secondary member, of and/or for a wireless communication network may generally be adapted to schedule transmission of signals according to a schedule by arranging and/or distributing its transmissions accordingly.

The member, in particular a secondary member, may generally comprise a scheduling module for scheduling signals according to a schedule, which may be stored in a memory accessible by the scheduling module. The scheduling module may be implemented for example in control circuitry and/or scheduling may be performed by control circuitry, in particular scheduling control circuitry, which may be implemented utilizing a processing arrangement as described herein. The scheduling may generally comprise pre-arranging transmissions and/or transmitting according to the schedule. It may include mapping information from a scheduling message to a schedule to be used, which may be obtained from a memory accessible to the member and/or from another member of the network.

A member adapted for beam forming may comprise one or more beam forming modules for beam forming, which may be connected to an antenna arrangement and/or be implemented as part of a control circuitry or radio circuitry. A beam forming module may generally be for forming and/or moving and/or sweeping a beam.

A status of beam forming (beam forming status) performed may indicate or represent whether beam forming is performed or not and/or how beam forming is performed. It in particular may pertain and/or describe the shape, for example the width and/or angle of the beam/s, and/or the sweeping trajectory/ies, for example the direction and/or path and/or speed of the beam/s and/or the amount of time the beam/s is/are directed to and/or onto and/or include/s the secondary member, if transmitted (or used for reception) by the first member (or, in reception, to allow reception of signals/sounding signals from the secondary member), and/or the amount of time the beam/s is/are directed to and/or onto and/or include/s the first member, if transmitted (or used for reception) by the secondary member. The beam forming status of a network may pertain to at least the beam forming status of a first member, and may include the status of at least a secondary member and/or more than one first member. A beam forming status may generally pertain to one or more than one beams.

A first member may be adapted to transmit a scheduling message referring to a compact schedule if beam forming is performed. It may be envisioned that a first member is adapted to determine the status of beam forming, e.g. via its control circuitry and/or via obtaining corresponding information from another member of the network, e.g. a secondary member. For example, if the first member performs beam forming, its control circuitry will be aware of this.

In the context of this specification, wireless communication may be communication, in particular transmission and/or reception of data, via electromagnetic waves, in particular radio waves, e.g. utilizing a radio access technology (RAT). The communication may be between members or nodes of a wireless communication network. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication.

It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in communication may comprise radio circuitry and/or control circuitry and/or antenna circuitry, which may be arranged to utilize and/or implement one or more than one radio access technologies.

Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Radio circuitry may comprise for example a receiver device and/or transmitter device and/or transceiver device.

Control circuitry of a node may comprise a controller or processing arrangement and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a user equipment is configured to be a user equipment adapted for LTE/E-UTRAN.

A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises or may be connected or connectable to memory, which may be adapted to be accessible for reading and/or writing by the controller and/or control circuitry.

Radio access technology may generally comprise GERAN and/or UTRAN and/or in particular E-UTRAN and/or LTE. A communication may in particular comprise a physical layer (PHY) transmission and/or reception, onto which logical channels and/or logical transmission and/or receptions may be imprinted or layered.

A user equipment (UE) may generally be a device configured for wireless device-to-device communication and/or a terminal for a wireless and/or cellular network, in particular a mobile terminal, for example a mobile phone, smart phone, tablet, PDA, etc. It may be considered that a user equipment comprises radio circuitry and/control circuitry for wireless communication.

A base station may be any kind of base station of a wireless and/or cellular network adapted to serve one or more user equipments. A base station may be adapted to provide and/or define one or more cells of the network. It may be considered that a base station comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device.

It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in wireless communication. Generally, a base station may be arranged to communicate with a core network and/or to provide services and/or control to one or more user equipments and/or to relay and/or transport communications and/or data between one or more user equipments and a core network and/or another base station.

An eNodeB (eNB) may be envisioned as a base station, in particular as a base station according to LTE. It may be considered that a base station such as an eNB is configured as or connected or connectable to an Evolved Packet Core (EPC) and/or to provide and/or connect to corresponding functionality. The functionality and/or multiple different functions of a base station may be distributed over one or more different devices and/or physical locations. A base station may be considered to be a node of a wireless communication network.

A storage medium may be any kind of medium suitable to store instructions readable by control circuitry, e.g. a random access memory and/or flash memory and/or non-volatile memory and/or optical storage medium like a CD (Compact Disc) or DVD (Digital Versatile Disc) and/or hard disk.

A first message or schedule referring or pertaining to a(nother or second) schedule may describe that the (second) schedule referred to may be determined based on the (first) message or schedule, e.g. utilizing a mapping like a table, which may be stored in a memory of a member. A schedule in this context may refer to itself. It should be noted that as used herein, "refer" may be considered synonymous to "indicate" and/or may be replaced therewith.

A sounding signal schedule may be based on a scheduling message, which may be received by a secondary member, e.g. from a first member. The sounding signal schedule may generally refer to the schedule the according to which the secondary member schedules and/or intends to transmit sounding signals. The scheduling message may be based on a schedule determined by the first member (e.g., for the secondary member or for one or more secondary members). A sounding signal schedule generally may be based on the scheduling message and/or the schedule determined by the first member, for example it may correspond to this schedule (or the content of the scheduling message) and/or be equal to it, and/or may be extracted from the schedule message such as to extract only information (scheduling information) relevant to and/or intended for the secondary member. It may be considered that the sounding signal schedule is modified over the schedule determined by the first member, e.g. according to operating conditions of the secondary member. Generally, a sounding signal schedule may schedule a secondary member for transmission of sounding signals. Sounding signals may comprise e.g. SRS.

Some abbreviations used:

| Abbreviation | Explanation |
| --- | --- |
| DL | Downlink |
| eNB | evolved NodeB, base station |
| E-UTRAN | evolved UMTS Terrestrial Radio Access Network |
| GERAN | GSM Edge RAN |
| GSM | Global System for Mobile Communication |
| IFFT | Inverse Fast Fourier Transform |
| LTE | Long-Term Evolution |
| OFDM | Orthogonal Frequency-Division Multiplexing |
| PRACH | Physical Random-Access Channel |
| PRB | Physical Resource Block |
| PUSCH | Physical Uplink Shared Channel |
| RAN/RAT | Radio Access Network/Radio Access Technology |
| RE | Resource Element |
| SRS | Sounding Reference Signals |
| TDD | Time-Division Duplex |
| UE | User Equipment |
| UL | Uplink |
| UTRAN | UMTS Terrestrial Radio Access Network |

These abbreviations may be used according to the LTE standard.

LIST OF REFERENCE NUMERALS

10 Secondary member
12 Radio circuitry
14 Control Circuitry
16 Antenna arrangement
100 First member
102 Radio circuitry
104 Control Circuitry
106 Antenna arrangement

The invention claimed is:

1. A method for operating a wireless communication network, wherein the method comprises:
    transmitting, by a first node of the network, a scheduling message to a second node of the network;
    receiving, by the second node, the scheduling message; and
    scheduling, by the second node, sounding signal transmissions according to a compact sounding signal schedule, based on the scheduling message,
    wherein the compact sounding signal schedule schedules sounding signal transmissions based on a status of beam forming performed in the network, and the compact sounding signal schedule schedules sounding signal transmissions in a compact timeframe of fewer than four subframes.

2. The method of claim 1, wherein the compact sounding signal schedule is based upon at least one of the shape and sweeping trajectory of a beam formed by at least one of the first node and the second node.

3. The method of claim 1, wherein the compact sounding signal schedule provides sounding of a bandwidth of a carrier or channel in the compact timeframe such that at least one subband of the bandwidth is sounded at least twice within the compact timeframe.

4. The method of claim 1, wherein the compact sounding signal schedule is at least one of providing and scheduling sounding signals covering at least 50% of at least one of the sub bands and resource blocks of the bandwidth or carrier within the compact timeframe.

5. The method of claim 1, wherein the compact sounding signal schedule schedules a pattern repeatedly over the compact timeframe.

6. The method of claim 1, wherein the compact sounding signal schedule provides scheduling of non-sounding signals, in particular PUSCH signals, which optionally may be shifted such that PUSCH signals and SRS signals do not overlap.

7. A method for operating a first node in a wireless communication network, wherein:
transmitting, by the first node, a scheduling message for a second node of the network, wherein the scheduling message refers to a compact sounding signal schedule for scheduling sounding signal transmissions based on a status of beam forming performed in the network, and the compact sounding signal schedule schedules sounding signal transmissions in a compact timeframe of fewer than four subframes.

8. The method of claim 7, wherein the compact sounding signal schedule is based upon at least one of the shape and sweeping trajectory of a beam formed by at least one of the first node and the second node.

9. The method of claim 7, wherein the compact sounding signal schedule provides sounding of a bandwidth of a carrier or channel in the compact timeframe such that at least one subband of the bandwidth is sounded at least twice within the compact timeframe.

10. The method of claim 7, wherein the compact sounding signal schedule is at least one of providing and scheduling sounding signals covering at least 50% of at least one of the sub bands and resource blocks of the bandwidth or carrier within the compact timeframe.

11. The method of claim 7, wherein the compact sounding signal schedule schedules a pattern repeatedly over the compact timeframe.

12. The method of claim 7, wherein the first node provides scheduling of non-sounding signals, in particular PUSCH signals.

13. A method for operating a second node in a wireless communication network, wherein:
receiving, by the second node, a scheduling message from a first node; and
scheduling, by the second node, sounding signal transmissions according to a compact sounding signal schedule, based on the scheduling message,
wherein the compact sounding signal schedule schedules sounding signal transmissions based on a status of beam forming performed in the network, and the compact sounding signal schedule schedules sounding signal transmissions in a compact timeframe of fewer than four subframes.

14. The method of claim 13, wherein the compact sounding signal schedule is based upon at least one of the shape and sweeping trajectory of a beam formed by at least one of the first node and the second node.

15. The method of claim 13, wherein the compact sounding signal schedule provides sounding of a bandwidth of a carrier or channel in the compact timeframe such that at least one subband of the bandwidth is sounded at least twice within the compact timeframe.

16. The method of claim 13, wherein the compact sounding signal schedule is at least one of providing and scheduling sounding signals covering at least 50% of at least one of the sub bands and resource blocks of the bandwidth or carrier within the compact timeframe.

17. The method of claim 13, wherein the compact sounding signal schedule schedules a pattern repeatedly over the compact timeframe.

18. The method of claim 13, wherein the compact sounding signal schedule provides scheduling of non-sounding signals, in particular PUSCH signals, which optionally may be shifted such that PUSCH signals and SRS signals do not overlap.

19. A first node for a wireless communication network, the first node comprising:
communication circuitry; and
processing circuitry configured to:
transmit, via the communication circuitry, a scheduling message for a second node, wherein the scheduling message refers to a compact sounding signal schedule for sounding signal transmissions based on a status of beam forming performed in the network, and
wherein the compact sounding signal schedule schedules sounding signal transmissions in a compact timeframe of fewer than four subframes.

20. A second node for a wireless communication network, the second node comprising:
communication circuitry; and
processing circuitry configured to:
receive, via the communication circuitry, a scheduling message from a first node; and
schedule sounding signal transmissions according to a compact sounding signal schedule, based on the scheduling message,
wherein the compact sounding signal schedule schedules sounding signal transmissions based on a status of beam forming performed in the network, and the compact sounding signal schedule schedules sounding signal transmissions in a compact timeframe of fewer than four subframes.

* * * * *